United States Patent
Wang

(10) Patent No.: US 8,726,013 B2
(45) Date of Patent: May 13, 2014

(54) ANTI-KEYLOGGER COMPUTER NETWORK SYSTEM

(71) Applicant: Chi-Pei Wang, Hsinchu (TW)

(72) Inventor: Chi-Pei Wang, Hsinchu (TW)

( * ) Notice: Subject to any disclaimer, the term of this patent is extended or adjusted under 35 U.S.C. 154(b) by 0 days.

(21) Appl. No.: 13/679,271

(22) Filed: Nov. 16, 2012

(65) Prior Publication Data

US 2013/0073849 A1 Mar. 21, 2013

Related U.S. Application Data

(63) Continuation-in-part of application No. 12/196,298, filed on Aug. 22, 2008, now abandoned.

(51) Int. Cl.
*H04L 29/06* (2006.01)
*G06F 12/14* (2006.01)
*G06F 7/04* (2006.01)
*G08B 21/00* (2006.01)
*H03K 17/94* (2006.01)

(52) U.S. Cl.
USPC ........... 713/164; 713/160; 713/187; 713/189; 726/26; 726/34; 341/22

(58) Field of Classification Search
USPC .............. 713/164, 160, 187, 189; 726/26, 34; 341/22
See application file for complete search history.

(56) References Cited

U.S. PATENT DOCUMENTS

| | | |
|---|---|---|
| 7,835,521 B1 | 11/2010 | Pinheiro |
| 2002/0049677 A1 | 4/2002 | Yamada et al. |
| 2005/0066186 A1 | 3/2005 | Gentle et al. |
| 2005/0236243 A1 | 10/2005 | Huang |
| 2006/0005017 A1 | 1/2006 | Black et al. |
| 2006/0068856 A1 | 3/2006 | Zhu et al. |
| 2006/0101128 A1 | 5/2006 | Waterson |
| 2006/0236088 A1 | 10/2006 | Walter |
| 2007/0027668 A1 | 2/2007 | Chen |
| 2007/0096946 A1* | 5/2007 | Kim et al. ........................ 341/22 |
| 2008/0122659 A1 | 5/2008 | Hou et al. |
| 2009/0070595 A1* | 3/2009 | Delia et al. .................... 713/189 |

* cited by examiner

*Primary Examiner* — Aravind Moorthy
(74) *Attorney, Agent, or Firm* — Egbert Law Offices, PLLC

(57) ABSTRACT

An anti-keylogger computer network system includes a servo-side host computer, with a servo software which requires the user to enter confidential data. An application-side host computer is provided and a keyboard is connected to the application-side host computer. The keys on the keyboard are divided into a data key and control key. An application software is installed in the application-side host computer to receive the instructions from the servo software, and to determine when the anti-keylogger function of the keyboard module shall be started and closed. A connection network is provided for connecting the servo-side host computer to the application-side host computer. A Translate Table program is installed in the application-side host computer and a Translate Table translation program is installed in the servo software of servo-side host computer.

3 Claims, 1 Drawing Sheet

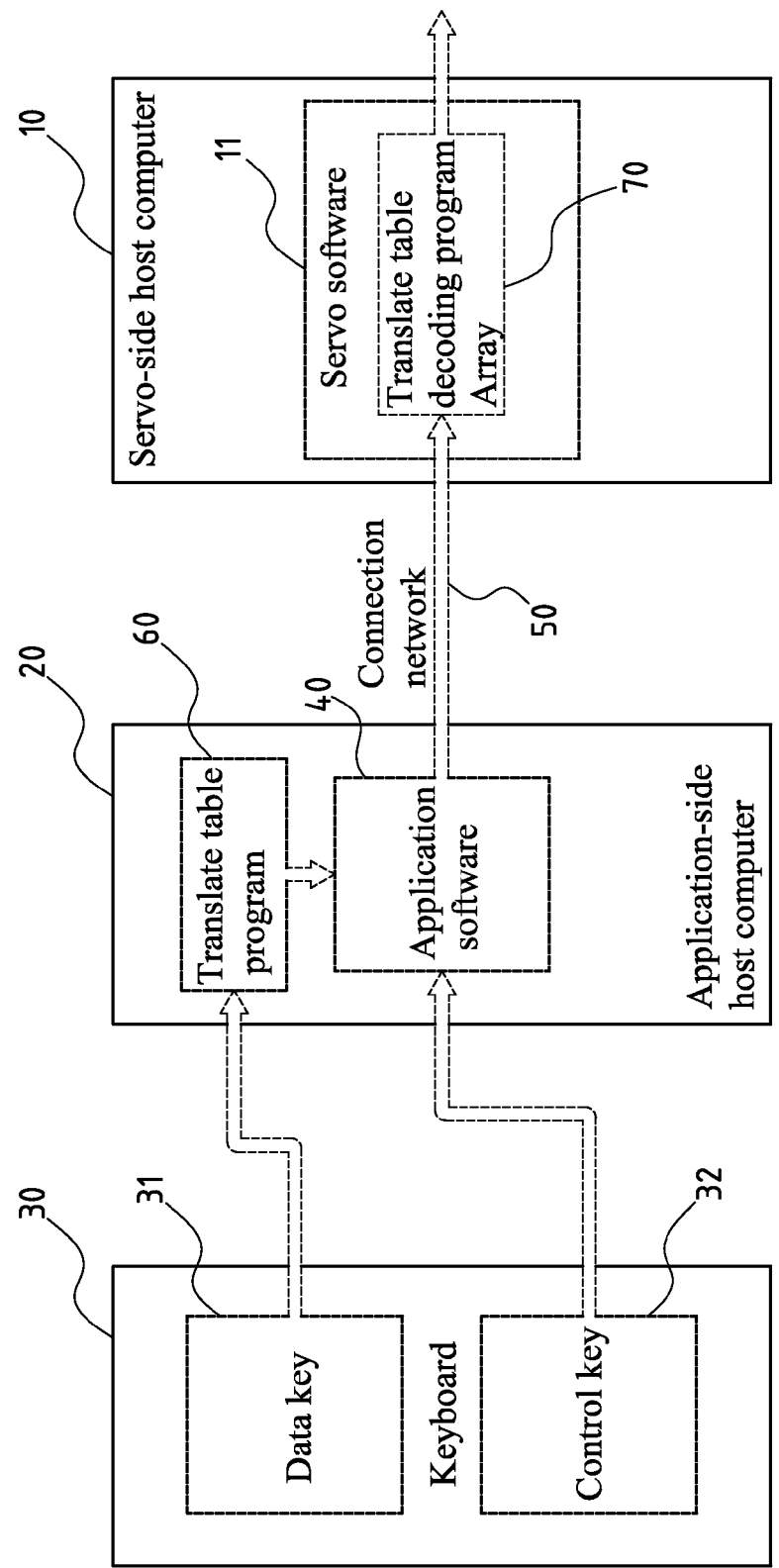

ANTI-KEYLOGGER COMPUTER NETWORK SYSTEM

CROSS-REFERENCE TO RELATED U.S. APPLICATIONS

The present application is a continuation-in-part of U.S. patent application Ser. No. 12/196,298, filed on Aug. 22, 2008, and entitled "Method For Anti-Keylogger", presently pending.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to an anti-keylogger computer network system and more particularly to an innovative anti-keylogger computer network system design which uses a Translate Table program to convert the value of the data key pressed by the user into another value and to export it for anti-keylogger effect.

2. Description of Related Art Including Information Disclosed Under 37 CFR 1.97 and 37 CFR 1.98.

The keyboard data of Personal Computer (PC) are implemented by the IO instructions of Central Processing Unit (CPU) and the IO ports $60h$ and $64h$ (note: h represents hexadecimal digit).

Due to the original architecture design factor of the PC, almost any software can obtain the data of keys on the keyboard easily, and the user will not be aware of any abnormity. Therefore, the keylogger or spy software uses this characteristic to steal personal account numbers and passwords illegally.

Intel, the largest CPU manufacturer in the world popularized a system platform called TMKBC several years ago. The user object of TMKBC is oriented to advanced commercial notebook computers, and the architecture must be equipped with a complete set of special computer chip (LaGrande Platform), including Trusted CPU, Trusted Chipset, Trusted Memory, Trusted Graphics, Trusted Platform Module (TPM) and TMKBC. Since this system platform involves too many technical levels, and it is incompatible with the existing software and hardware systems, and the implementation cost is too high, Intel does not popularize this new system platform anymore at present. The purpose of design of TMKBC is to protect the user's key data from being stolen, and its construction does not involve any encryption and decryption techniques or methods, the anti-keylogger technique is based on the entire trusted platform (LaGrande Platform) disallowing any software to read or change the keyboard data.

As there is no encryption keyboard product on the market at present, even if there are anti-virus and anti-spy software, it is often heard that on-line computer game users' treasures or points in the on-line games are stolen, or they have losses as their account passwords for on-line banks are keylogged. According to statistics, the loss caused by keylogger software is multiplied yearly, and many countries restrict the transactions of network finance. For example, the network bank may not handle non-designated account transfer, the non-designated account transfer on network. ATM may not exceed thirty thousand-currency units, some countries even forbid network banks.

Although the present computer network is equipped with various mature and stable encryption techniques, even if the encryption network protocol for computer network cannot solve the keylogger software and spy software problems, because the keyboard of the PC can be keylogged. The keylogger software and spy software will not disappear unless the keylogger problem is solved. Therefore, the anti-keylogger encryption keyboard is a necessary and important device for a computer network system, although the fundamental problem of keylogger is not solved, the encryption changes the key data keylogged by keylogger software into meaningless clobbers, unless the keylogger software knows how to decrypt, the anti-keylogger keyboard can prevent keylogger software and spy software in theory.

In addition, the present patent database has revealed the known techniques about encryption keyboard, for example, GOOGLE proposed the U.S. Pat. No. 7,835,521 keyboard patent of invention on Dec. 2, 2005. However, the practical application of the known keyboard anti-keylogger technique revealed in this case shows there are still some problems in it, for example, this technique specifies that only the predetermined corresponding decoding software is compatible with the hardware, and the encrypted data cannot be transmitted to the application software via the existing "standard keyboard interface", although the known techniques usually use one or more communication ports for transmission, the USB specification defines that one USB device has almost 16 endpoints, each endpoint can act as an independent transmission communication port; and a transmission line can connect multiple USB devices via USB hub, thus, the number of endpoints is larger than 16, but no matter how many transmission interfaces the USB device has, the transmission interface of USB keyboard is in fixed format, and the key data must conform to USB HID specifications, otherwise the key data cannot be transmitted via the USB standard keyboard interface to the predetermined application software; therefore, the compatibility and response speed of the keyboard anti-keylogger technique of Google are bad, each key pressed must be encrypted instantly, and the decryption consumes the computing capacity of CPU and MCU, so that the keyboard is very likely to take real-time response when the user types too fast, meaning there will be input delay.

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

The anti-keylogger function encrypts letter only, not the control key (i.e. function key), so the operation of anti-keylogger function does not influence the keyboard control function.

The key data can be uploaded to the application software via the communication port of the presently universal standard keyboard. As such, the system compatibility is higher, it is unnecessary to buy new keyboards or connecting lines, as long as a program is installed in the computer, the cost, is reduced greatly.

When the user presses a key, the key data is translated as encrypted. The one-to-one replacement is very fast, increasing the encryption conversion efficiency significantly, hardly influencing the user's feeling of operating keyboard, and he will not feel operation delay.

Although the invention has been explained in relation to its preferred embodiment, it is to be understood that many other possible modifications and variations can be made without departing from the spirit and scope of the invention as hereinafter claimed.

BRIEF DESCRIPTION OF THE SEVERAL VIEWS OF THE DRAWINGS

FIG. 1 is an architecture block diagram of a preferred embodiment of the present invention.

DETAILED DESCRIPTION OF THE INVENTION

Please refer to FIG. 1 for a better implementation case, or preferred embodiment, of this invention. This implementation case is for illustration only and the patent application is not limited to this structure.

The stated anti-keylogger computer network system comprises a servo-side host computer 10, a servo software 11 requires the user to enter confidential data, such as user account, password, ID card numbers, birthday, credit card number, amount of transaction, quantity and so on.

An application-side host computer 20 is provided.

A keyboard 30 is connected to the application-side host computer 20. The keys on the keyboard are divided into data key 31 and control key 32.

An application software 40 is installed in the application-side host computer 20 for receiving the instructions from the servo software 11 and determining when the anti-keylogger function of keyboard 30 shall be started and closed. The application-side host computer 20 is incapable of decrypting the encrypted key data, meaning the application software has no decoding algorithm and key settings.

A connection network 50 is provided for connecting the servo-side host computer 10 to the application-side host computer 20.

A Translate Table program 60 is installed in the application-side host computer 20. The Translate Table program 60 can translate the letter or value of data key 31 pressed by the user into another letter or value according to the preset translation rules, so as to achieve the anti-keylogger effect. The Translate Table program 60 only encrypts the data key 31, not the control key 32.

A Translate Table translation program 70 is installed in the servo-side host computer 10. The Translate Table translation program 70 can translate back the letter or value of data key 31 pressed by the user according to the translation rules of Translate Table program 60.

Following the aforesaid system construction, the kernel design of this invention is to create a Translate Table program 60 in the servo-side host computer 10, so as to translate the letter or value of data key 31 pressed by the user into another letter or value. For example, the Translate Table program 60 can translate a, b, c, d, e . . . of data key 31 into b, e, d, e, f . . . (i.e. next code), on this translation principle, when the user presses data key 31 (a), the entire keyboard 30 actually uploads (b) to the application software 40 in the application-side host computer 20, so the keylogger software and spy software obtain the translated misdata (equivalent to encryption). Thus, the key data will not be stolen illegally. Afterwards, the servo software 11 in the terminal servo-side host computer 10 translates back the (b) uploaded by the application software 40 into (a) pressed by the user according to the corresponding translation principle of Translate Table program 60, meaning the final data from the servo-side host computer 10 is still that pressed by the user.

In addition, the purpose of the Translate Table program 60 is to replace the letters or values of data key 31 one to one, so as to maximize the compatibility, and the translated data key 31 still can transmit information via the "standard keyboard interlace", meaning each key data can be uploaded to the application software 40 via the communication port of the presently universal standard keyboard, the compatibility is higher.

The translation rules of Translate Table program 60 can be changed by a triggering means. The triggering means refers to when the user presses the preset control key 32 (e.g. Enter, Tab, Mouse clicks etc.), the translation rules of Translate Table, program 60 are changed at the same time, for example, the preset rule of translating abcde into bcdef is changed to translating abcde into cdefg; so that each translation rule is used for a while to enhance the encryption effect. This design considers this invention using the encryption effect of the stated Translate Table program, but the single translation mode is likely to be decrypted for the stiff pattern. Therefore, this problem can be solved effectively by changing the translation rules of the Translate Table program frequently.

The Translate Table translation program 70 is independent decoding software, or embedded in the servo software 11 (e.g. IE, Firefox, Chrome, Notepad, Word, etc.) in the servo-side host computer 10 by Hook (as shown in FIG. 1), the compatibility is very high.

This invention uses the Translate Table program 60 for anti-keylogger, and it can improve the encryption conversion efficiency; in the known keyboard encryption mode, each key data must be encrypted by encryption algorithm before it is transmitted to the application software for decryption, and the HID data of a key is 1 byte, it will turn into 16 bytes by AES 128 operational method (note: AES is symmetrical block encryption method, each data is fixed at 128-bit), meanwhile the 16 bytes are random clobbers, they cannot be transmitted to the application software via standard keyboard interface directly, otherwise the overall system will be in disorder once corresponding to non-letter key (i.e. control key of this invention), then the encrypted literal data shall be obtained by "non-keyboard" interface, the important side effect of each key executing encryption and decryption is that the information transfer efficiency of key will decrease. On the contrary, the data encryption position of this invention is the Translate Table program 60, when the user presses a key, the key data is translated as encrypted, the one-to-one replacement is very fast, hardly influencing the user's feeling of operating the keyboard, and the user will not feel operation delay.

In addition, it must be declared that the application-side host computer 20 transfers the Translate Table program 60 encrypted key data directly to the servo-side host computer 10 in the network, so the application-side host computer 20 does not process or store the decrypted key data.

I claim:

1. An anti-keylogger computer network system comprising:
- a servo-side host computer having a servo software so as to require a user to enter confidential data;
- an application-side host computer;
- a keyboard connected to said application-side host computer, said keyboard having keys divided into data keys and control keys;
- an application software installed in said application-side host computer so as to receive instructions from said servo software and for determining when an anti-keylogger function of said keyboard is started and closed, said application-side host computer being incapable of decrypting encrypted key data, said application software having no decoding algorithm and no key settings;
- a connection network connecting to said servo-side host computer to said application-side host computer;
- a translate table program installed in said application-side host computer, said translate table program for translating a letter or a value of the data key pressed by the user into another letter or another value and for exporting the another letter or the another value into preset translation rules, said translate table program only encrypting the data key and not the control key;
- a translate table translation program installed in said servo-side host computer, said translate table translation program for translating back the letter or the value of the data key pressed by the user according to the preset translation rules of said translate table program.

2. The anti-keylogger computer network system of claim 1, wherein said translation rules of said translate table program are changeable by a trigger caused by a pressing of the control key by the user and wherein the translation rule of said translation table program is changed simultaneously.

3. The anti-keylogger computer network system of claim 1, wherein said translate table translation program is independent decoding software or is embedded in said servo software in said servo-side host computer.

* * * * *